(12) United States Patent
Trimble

(10) Patent No.: US 6,473,033 B1
(45) Date of Patent: Oct. 29, 2002

(54) INTEGRATED PSEUDOLITE/SATELLITE BASE STATION TRANSMITTER

(75) Inventor: Charles R. Trimble, Sunnyvale, CA (US)

(73) Assignee: Trimble Navigation, Ltd, Sunnyvale, CA (US)

( * ) Notice: Subject to any disclaimer, the term of this patent is extended or adjusted under 35 U.S.C. 154(b) by 0 days.

(21) Appl. No.: 09/812,011

(22) Filed: Mar. 18, 2001

(51) Int. Cl.[7] .............................. G01S 5/02; H04B 7/185
(52) U.S. Cl. .............................. 342/357.14; 342/357.06; 701/213
(58) Field of Search ....................... 342/357.14, 357.06; 701/213

(56) References Cited

U.S. PATENT DOCUMENTS 6,002,362 A * 12/1999 Gudat .................. 342/357.03
6,198,432 B1   3/2001 Janky ................... 342/357.14
6,239,743 B1 * 5/2001 Lennen .................. 342/357.12

* cited by examiner

*Primary Examiner*—Theodore M. Blum
(74) *Attorney, Agent, or Firm*—Boris G. Tankhilevich

(57) ABSTRACT

An integrated split-spectrum pseudolite/satellite base station (SS-PL)/SBS transmitter comprising a satellite base station and a split-spectrum pseudolite (SS-PL) transmitter co-located with the satellite base station. The satellite base station provides a timing synchronization signal. The satellite base station also provides a self-surveying capability for the split-spectrum pseudolite (SS-PL). The split-spectrum pseudolite (SS-PL) generates a split-spectrum sideband signal that minimizes interference with the reception of at least one satellite signal by the satellite base station.

34 Claims, 7 Drawing Sheets

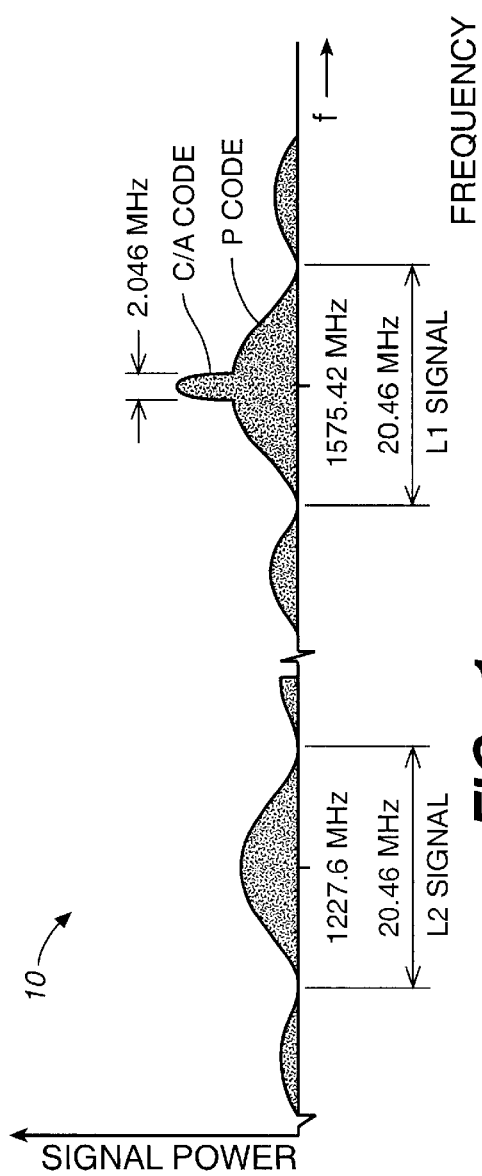
FIG._1 (PRIOR ART)
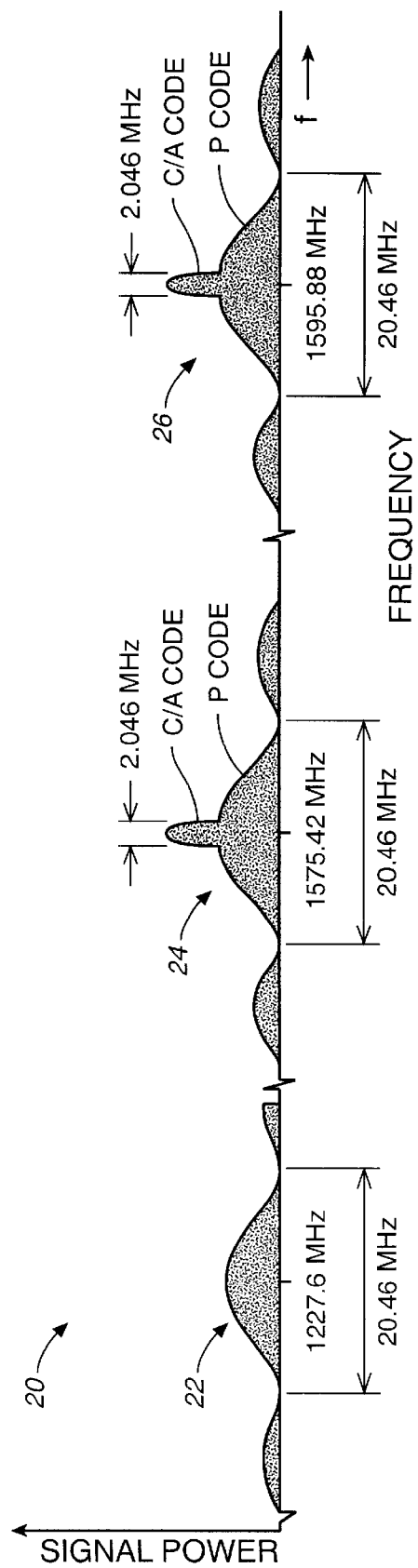
FIG._2

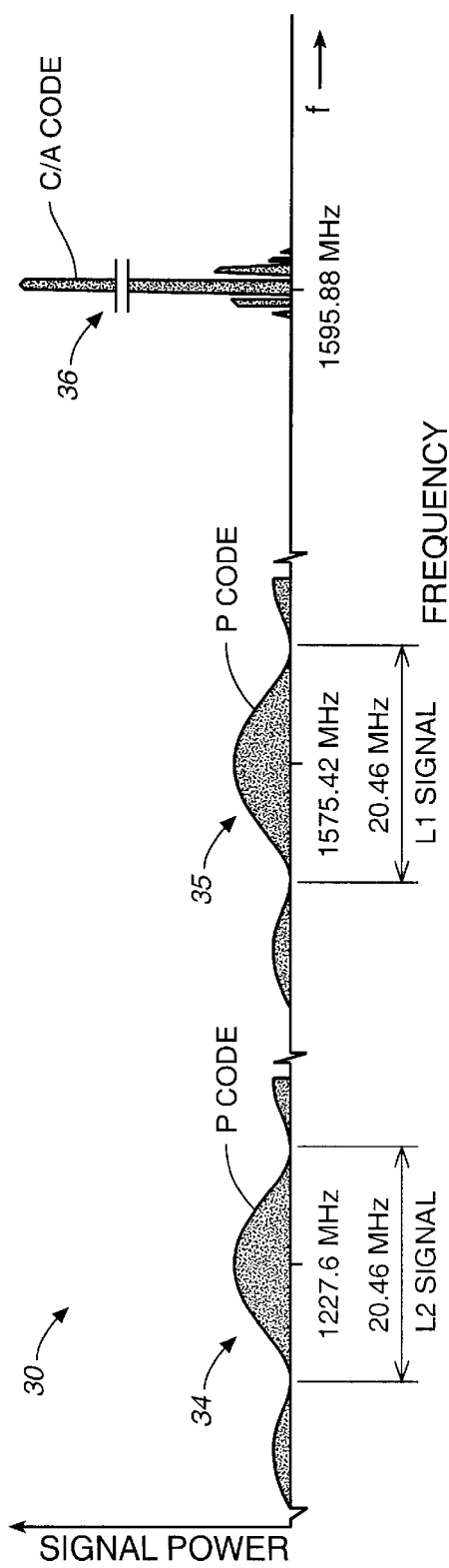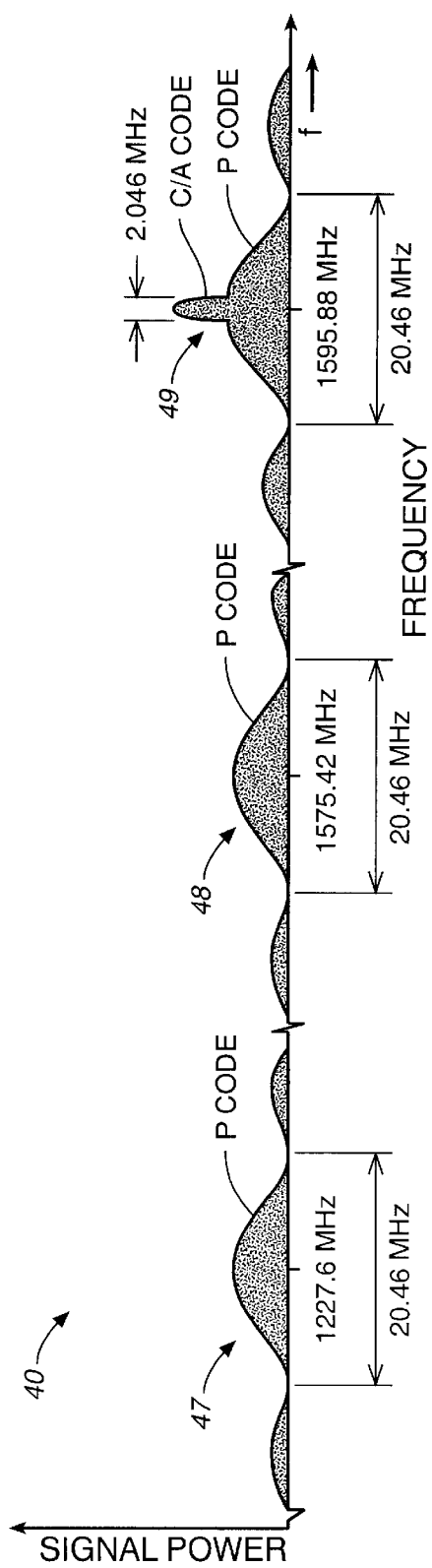

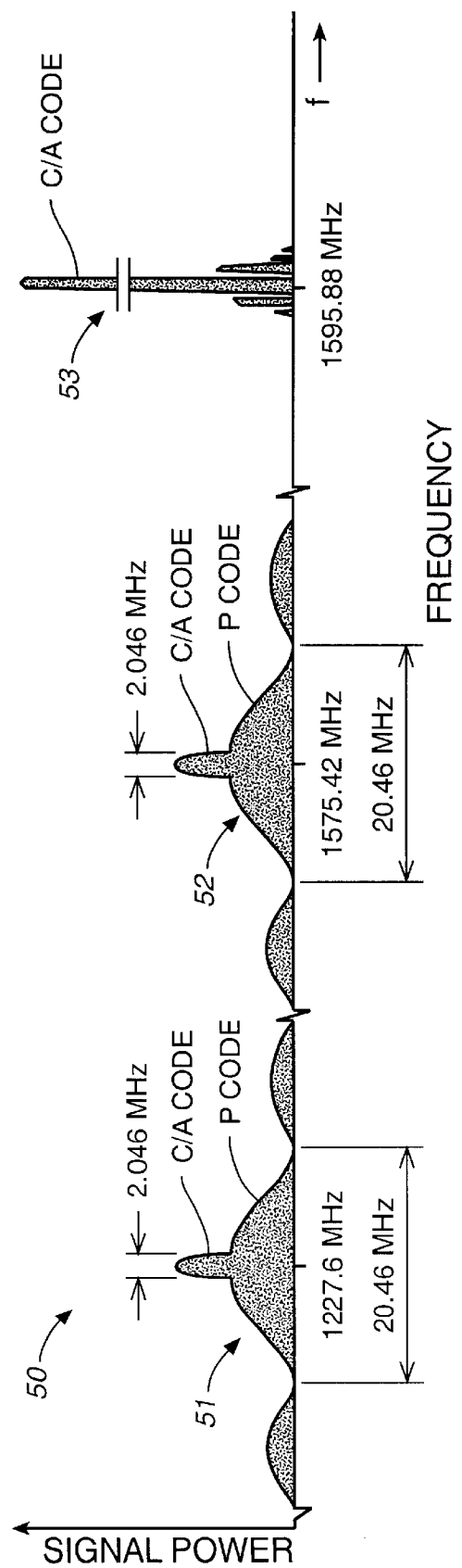
FIG._5

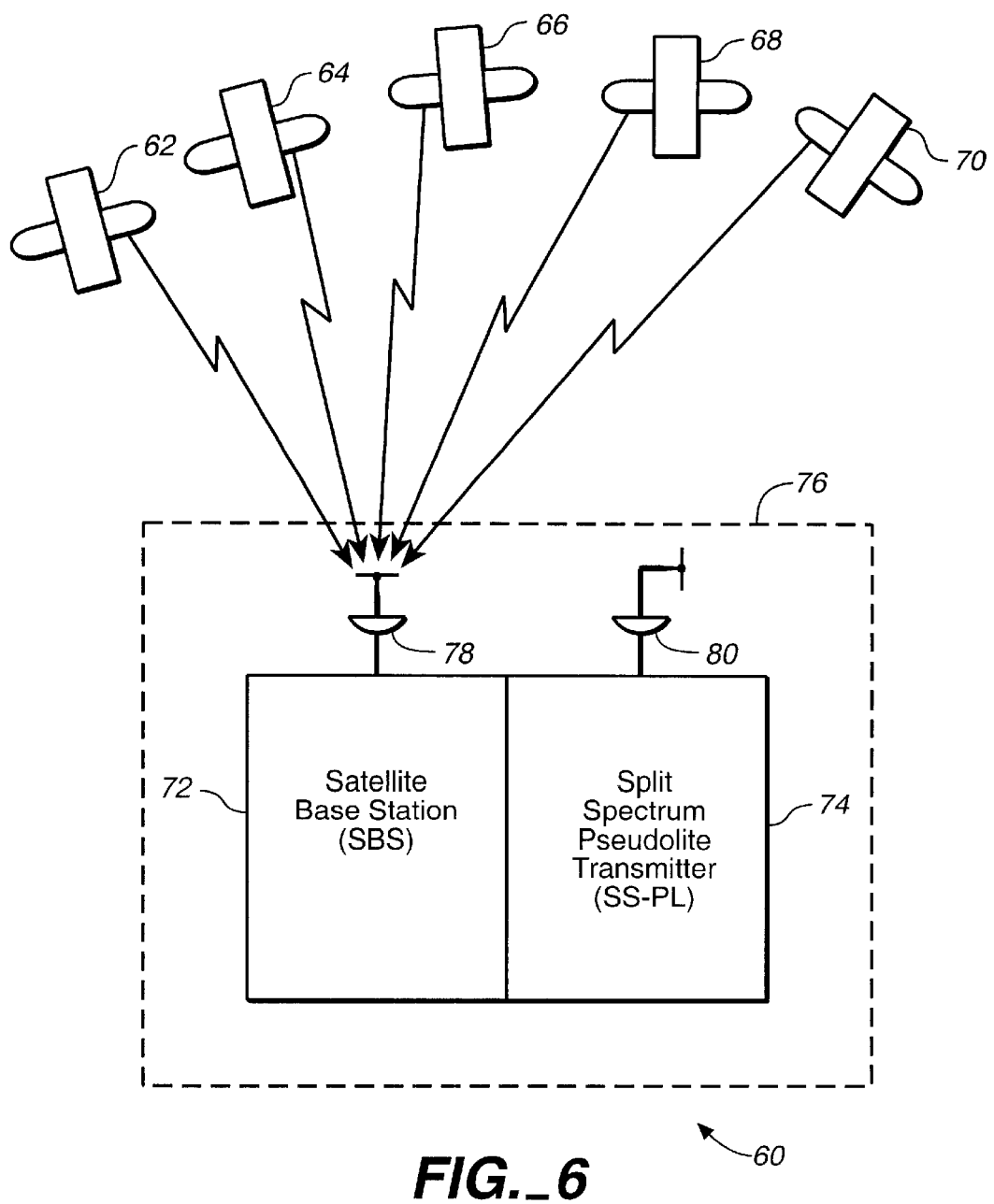
FIG._6

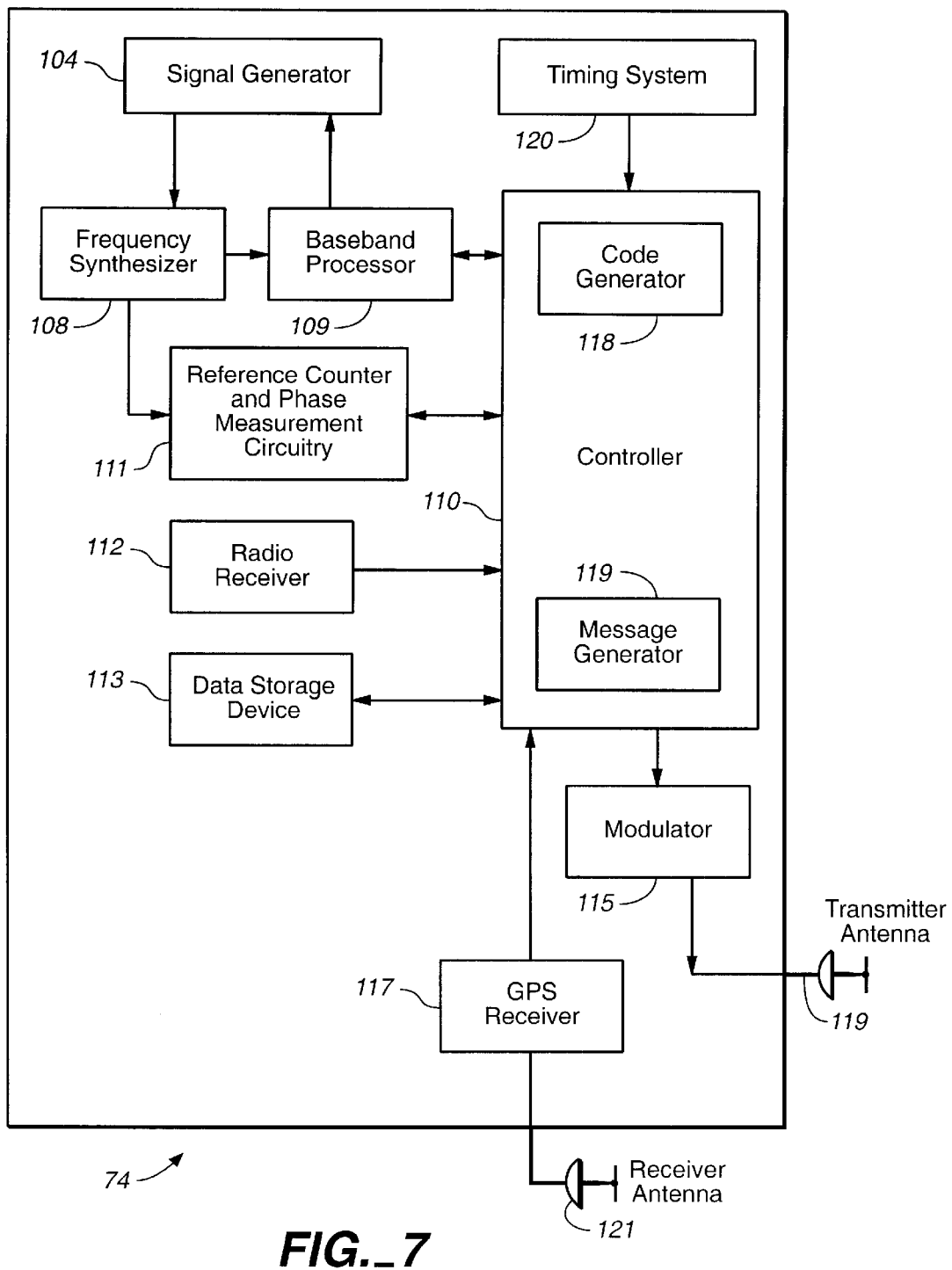
FIG._7

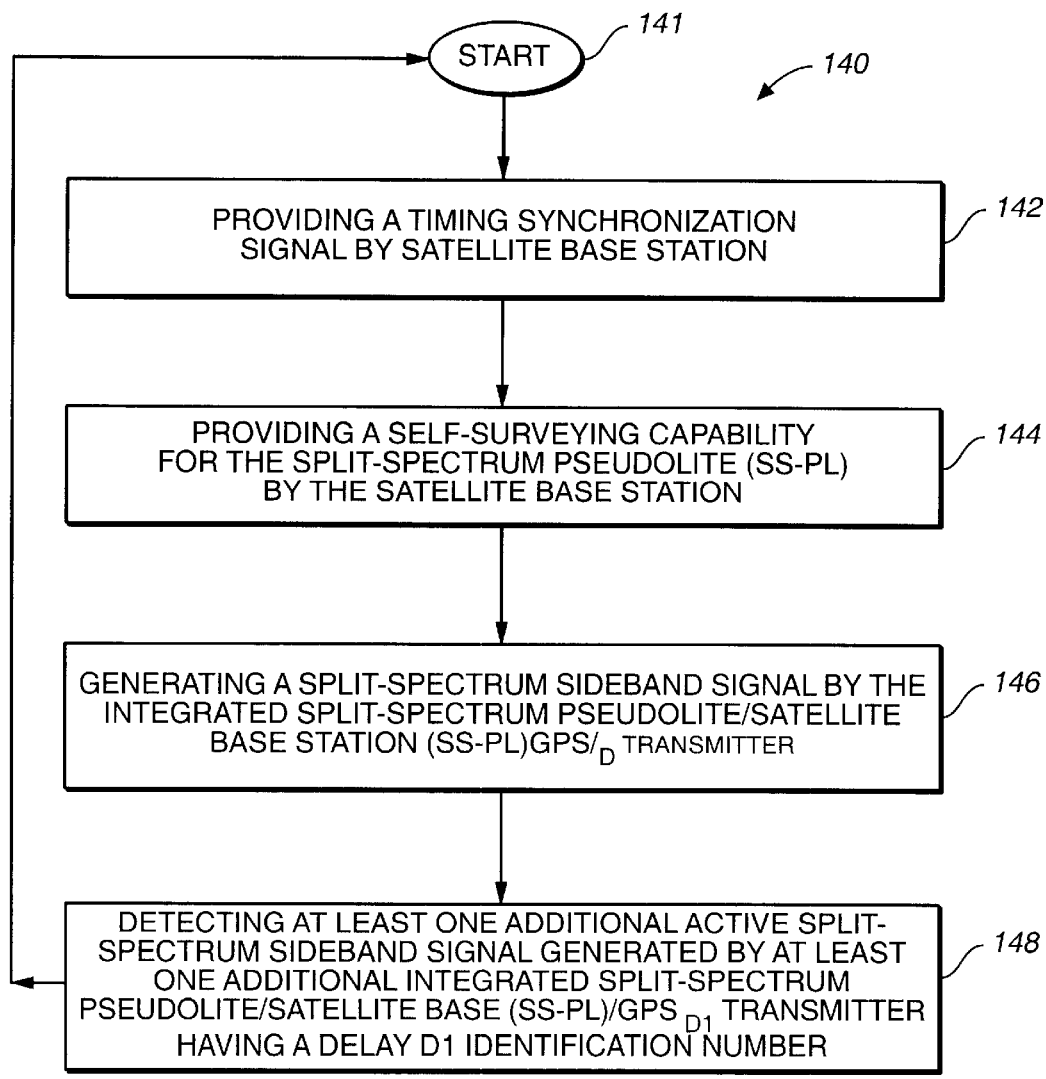
FIG._8

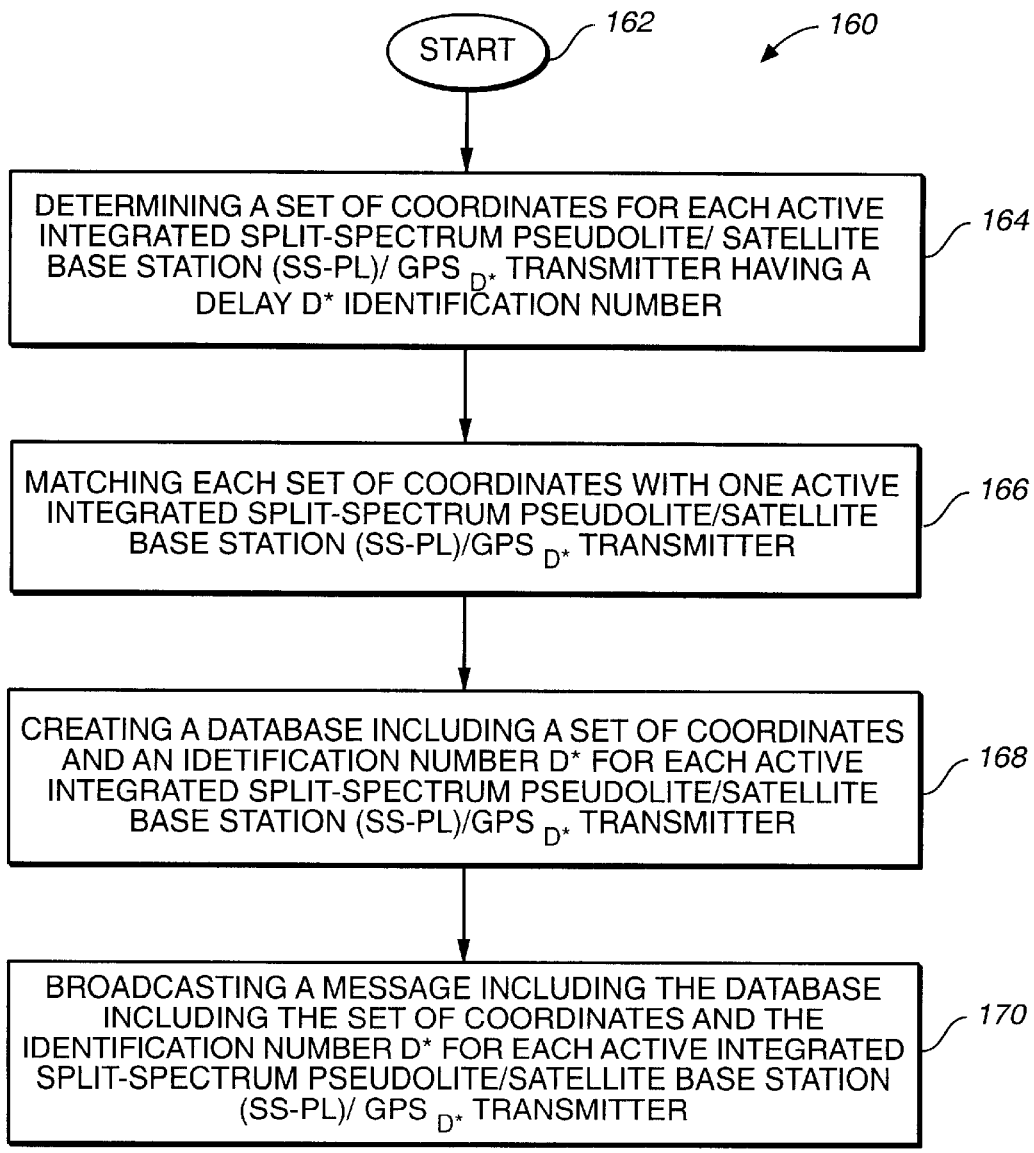
FIG._9

INTEGRATED PSEUDOLITE/SATELLITE BASE STATION TRANSMITTER

BACKGROUND OF THE INVENTION

1. Field of the Invention

The present invention relates to pseudolite transmitters, or more specifically, to an integrated split spectrum pseudolite/satellite base station transmitter.

2. Discussion of the Prior Art

The Global Positioning System (GPS) is a system of satellite signal transmitters that transmits information from which an observer's present location and/or the time of observation can be determined. Another satellite-based navigation system is called the Global Orbiting Navigational System (GLONASS), which can operate as an alternative or supplemental system.

The GPS was developed by the United States Department of Defense (DOD) under its NAVSTAR satellite program. A fully operational GPS includes more than 21 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, and can be used to determine an observer's position anywhere on the Earth's surface, 24 hours per day. Each satellite carries a cesium or rubidium atomic clock to provide timing information for the signals transmitted by the satellites. An internal clock correction is provided for each satellite clock.

Each GPS satellite continuously transmits two spread spectrum, L-band carrier signals: an L1 signal having a frequency f1=1575.42 MHz (nineteen centimeter carrier wavelength) and an L2 signal having a frequency f2=1227.6 MHz (twenty-four centimeter carrier wavelength). GPS satellites transmit both a C/A code and a P-code. There are a total of 32 pseudo random (PRN) C/A codes, with each satellite generating a different C/A code. The code modulations that produce either a P-code or a C/A code are impressed onto the L1 carrier and the L2 carrier.

The deployment of additional frequencies is being planned by the DOD. More specifically, DOD is exploring several options to maintain, or improve, the performance of civilian applications of GPS without compromising military utilities. Indeed, the civilian community does not have a second frequency. Today, corrections are based upon L2, which is a military frequency, and subject to DOD use and control. The addition of L5 to the GPS constellation on the Block HF satellites would, at a minimum, assure the civilian community of the existence of reliable dual frequency transmissions.

As a result, a new GPS frequency, L5, is being considered for civil sector uses in order to reserve L2 for military purposes. This new frequency is targeted to provide both carrier phase and C/A-code range information. Two frequencies are proposed for L5; the first being 1207 MHz yielding a 368 MHz separation from L1, and the second being 1309 MHz having a separation of 266 MHz from The GPS satellite bit stream includes navigational information on the ephemeris of the transmitting GPS satellite (which includes orbital information about the transmitting satellite within next several hours of transmission) and an almanac for all GPS satellites (which includes a less detailed orbital information about all other satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS satellites have circular orbits with a radii of about 25,510 kilometers and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9k/16)$ GHz and $f2=(1.246+7k/16)$ GHz, where $k$ ($=1,2,\ldots 24$) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals.

The European Union plans to develop by 2008 the system of navigation and positioning by satellite designed exclusively for civil purposes-the GALILEO system. GALILEO should enable each individual, by way of a small, cheap individual receiver, to know his or her position to within a few meters, with guaranteed continuity of transmission of the signal. The GALILEO project, supported by the European Space Agency, aims to launch a series satellites at around 20 000 km to be monitored by a network of ground control stations, in order to provide world cover. GALILEO system should be integrated into the existing GNSS-Global Navigation Satellite System, comprising at present time GPS and GLONASS satellite systems.

Reference to a Satellite Positioning System or SATPS herein refers to a Global Positioning System, to a Global Orbiting Navigation System, to a GALILEO project, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

The range ($r_i$) between the location of the i-th SATPS satellite and the SATPS receiver is equal to the speed of light c times ($\Delta t_i$), wherein ($\Delta t_i$) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver estimates a pseudo-range ($pr_i$) (not a true range) to each satellite.

After the SATPS receiver determines the coordinates of the i-th SATPS satellite by demodulating the transmitted ephemeris parameters, the SATPS receiver can obtain the solution of the set of the simultaneous equations for its unknown coordinates ($x_0, y_0, z_0$) and for unknown time bias error (cb). The SATPS receiver can also determine velocity of a moving platform.

The given below discussion, (applicable to any satellite navigational system, but focused on GPS applications to be substantially specific) can be found in "Global Positioning System: Theory and Applications", Volume II, Chapters 1 and 5, by Bradford W. Parkinson and James J. Spilker Jr., published by the American Institute of Aeronautics and Astronautics, Inc. in 1996.

Typically, GPS based positions are calculated using the World Geodetic System of 1984 (WGS84) coordinate system. These positions are expressed in Earth Centered Earth Fixed (ECEF) coordinates of X, Y, and Z axes. These positions are often transformed into latitude, longitude, and height relative to the WGS84 ellipsoid.

Differential Global Positioning System (DGPS) is a technique that significantly improves both the accuracy and the integrity of the Global Positioning System (GPS). The most common version of DGPS requires high-quality GPS "reference receivers" at known, surveyed locations. The reference station estimates the slowly varying error components of each satellite range measurement and forms a correction for each GPS satellite in view. This correction is broadcast to all DGPS users on a convenient communication link. Typical ranges for a local area differential GPS (LADGPS) station are up to 150 km. Within this operating range, the differential correction greatly improves accuracy for all users, regardless of whether selective availability (SA) is activated or is not. This improvement in the accuracy of the Global Positioning System (GPS) is possible because the largest GPS errors vary slowly with time and are strongly correlated over distance. DGPS also significantly improves the "integrity" of GPS for all classes of users, because it reduces the probability that a GPS user would suffer from an unacceptable position error attributable to an undetected system fault.

Most DGPS systems use a single reference station to develop a scalar correction to the code-phase measurement. If the correction is delivered within 10 seconds, and the user is within 1000 km, the user accuracy should be between 1 and 10 meters. Users with very stringent accuracy requirements may be able to use a technique called carrier-phase DGPS or CDPGS. These users measure the phase of the GPS carrier relative to the carrier phase at a reference site; thus achieving range measurement precision that is a few percent of the carrier wavelength, typically about one centimeter. These GPS phase comparisons are used for vehicle attitude determination and also in survey applications, where the antennas are separated by tens of kilometers. If the antennas are fixed, then the survey is called static, and millimeter accuracies are possible, because long averaging times can be used to combat random noise. If the antennas are moving, then the survey is kinematic, and shorter time constants should be used with some degradation of accuracy.

Pseudolites (PLs) are ground-based transmitters that can be configured to emit GPS-like signals for enhancing the GPS by providing increased accuracy, integrity, and availability. Accuracy improvement can occur because of better local geometry, as measured by a lower vertical dilution of precision (VDOP). Availability is increased because a PL provides an additional ranging source to augment the GPS constellation.

However, a potential user of PL ranging signals should address the "near-far" problem associated with the PL signal level. One solution to the near-far problem is to configure a set of pseudolites operating within the GPS frequency bands ($L_1$:1565-1585 MHz or $L_2$:1217-1237 MHz) to serve a limited area with a power level low enough to preclude appreciable interference to standard GPS signals. Another solution to the near-far problem is to design the PL signal configuration to operate within $L_1$ band and mitigate or virtually eliminate the near-far issue.

What is needed is a pseudolite transmitter having a designed signal configuration that allows to operate within $L_1$ band and mitigate or virtually eliminate the near-far issue, integrated with a satellite base station (SBS) that allows to lock the timing of the pseudolite transmitter to the satellite time, and to provide an automatic determination of the location of the integrated pseudolite/satellite base station transmitter.

SUMMARY OF THE INVENTION

To address the shortcomings of the available art, the present invention provides an integrated split-spectrum pseudolite/satellite base station (SS-PL)/SBS transmitter that allows to lock the timing of the (SS-PL) ranging signals to the satellite time, and to provide an automatic determination of the location of the integrated split-spectrum pseudolite/satellite base station (SS-PL)/SBS system.

One aspect of the present invention is directed to an integrated split-spectrum pseudolite/satellite base station (SS-PL)/SBS transmitter comprising: (a) a satellite base station (SBS); and (b) a split-spectrum pseudolite (SS-PL) transmitter co-located with the SBS.

In the preferred embodiment, the split-spectrum pseudolite (SS-PL) generates a split-spectrum sideband signal that minimizes interference with the reception of at least one satellite signal by the SBS, and the SBS provides a timing synchronization signal, and provides a self-surveying capability for the (SS-PL).

In one embodiment of the present invention, the integrated split-spectrum pseudolite/satellite base station (SS-PL)/SBS transmitter includes a differential GPS base station configured to provide a GPS timing synchronization signal to the SS-PL transmitter, and configured to provide the self-surveying capability for the (SS-PL) transmitter with a sub-meter accuracy. In another embodiment of the present invention, the integrated split-spectrum pseudolite/satellite base station (SS-PL)/SBS transmitter comprises an RTK GPS base station configured to provide a GPS timing synchronization signal to the split-spectrum (SS-PL) transmitter, and configured to provide the self-surveying capability for the split-spectrum pseudolite (SS-PL) with a centimeter accuracy.

In the preferred embodiment of the present invention, the integrated split-spectrum pseudolite (SS-PL)/RTK GPS base station transmitter configured to transmit position determining split-spectrum L1 GPS comprises a code generator for generating a pseudolite P-code. In one embodiment, the integrated split-spectrum pseudolite (SS-PL)/RTK GPS base station transmitter further includes a modulator for modulating the code and the GPS navigation data to produce a modulated split-spectrum sideband L1 signal. In another embodiment, the integrated split-spectrum pseudolite (SS-PL)/RTK GPS base station transmitter further includes a modulator for modulating the code and the GPS navigation data to produce a modulated split-spectrum sideband L2 signal. In one additional embodiment, the integrated split-spectrum pseudolite (SS-PL)/RTK GPS base station transmitter further includes a modulator for modulating the code and the GPS navigation data to produce a modulated split-spectrum sideband L5 signal.

In one embodiment, the pseudolite P-code is delayed as compared with a GPS P-code by a delay D, and the delay D is used to identify the integrated split-spectrum pseudolite/satellite base station (SS-PL)/RTK GPS base station transmitter as a (SS-PL)/RTK $GPS_D$ ntransmitter having the D-identification number.

In one embodiment, the integrated split-spectrum pseudolite (SS-PL)/RTK GPS base station transmitter further includes: a GPS receiver configured for receiving a GPS satellite synchronization signal and for receiving a plurality of exact GPS satellite frequencies; a radio receiver for receiving a set of GPS formatted navigational data; a message generator for generating a set of (SS-PL) data message including a set of the (SS-PL) positional data responsive to the set of GPS formatted navigational data; a signal generator for generating a standard reference frequency; a pseudolite antenna for transmitting the position determining sideband L1, L2, or L5 split-spectrum signal; and a GPS receiver for detecting at least one additional integrated split-spectrum pseudolite (SS-PL)/RTK $GPS_{D1}$ transmitter having a D1-identification delay number.

In one embodiment, the integrated split-spectrum pseudolite (SS-PL)/RTK GPS base station transmitter includes a modulator configured to modulate the code and the GPS navigation data to produce a modulated split-spectrum sideband L1, (or L2, or L5) signal having a peak power at frequencies at which P(Y) code has nulls. In another embodiment, the integrated split-spectrum pseudolite (SS-PL)/RTK GPS base station transmitter includes a modulator configured to modulate the code and the GPS navigation data to produce a modulated split-spectrum sideband $(L1 \mp \Delta 1)$ MHz signal having a frequency shift $\Delta 1$ ( or $(L2 \mp \Delta 2)$ MHz signal having a frequency shift $\Delta 2$, or $(L5 \mp \Delta 5)$ MHz signal having a frequency shift $\Delta 5$), and having a peak power at frequencies at which P(Y) code has nulls.

Another aspect of the present invention is directed to a method for generating a split-spectrum sideband signal by an integrated split-spectrum pseudolite/satellite base station (SS-PL)/$GPS_D$ transmitter having a delay D identification number.

In one embodiment, the method of the present invention comprises the following steps: (1) providing a timing synchronization signal by the satellite base station; (2) providing a self-surveying capability for the split-spectrum pseudolite (SS-PL) by the satellite base station; and (3) generating a split-spectrum sideband signal by the integrated split-spectrum pseudolite/satellite base station (SS-PL)/$GPS_D$ transmitter. The split-spectrum sideband signal includes a set of position coordinates for the integrated split-spectrum pseudolite/satellite base station (SS-PL)/$GPS_D$ transmitter having the delay D identification number.

In the preferred embodiment, the method of the present invention further includes the steps of: (4) detecting at least one additional split spectrum sideband signal generated by at least one additional active integrated split-spectrum pseudolite/satellite base (SS-PL)/$GPS_{D*}$ transmitter having a delay D* identification number; (5) determining a set of coordinates for each integrated split-spectrum pseudolite/satellite base station (SS-PL)/$GPS_{D*}$ transmitter having the delay D* identification number; (6) matching each set of coordinates with one integrated split-spectrum pseudolite/satellite base station (SS-PL)/$GPS_{D*}$ transmitter; and (7) creating a database including a set of coordinates and an identification number D* for each integrated split-spectrum pseudolite/satellite base station (SS-PL)/$GPS_{D*}$ transmitter. In one embodiment, a message including the database including the set of coordinates and the identification number D* for each active integrated split-spectrum pseudolite/satellite base station (SS-PL)/$GPS_{D*}$ transmitter is broadcasted.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

FIG. 1 is a prior art diagram of power spectral density versus frequency for the current L1 and L2 GPS signal configuration.

FIG. 2 depicts a signal configuration transmitted by split-spectrum pseudolite (SS-PL) utilized in the present invention.

FIG. 3 is a signal configuration transmitted by split-spectrum pseudolite (SS-PL) utilized in the present invention, wherein two signals include a P-code, and one signal includes a C/A code.

FIG. 4 shows a signal configuration transmitted by split-spectrum pseudolite (SS-PL) utilized in the present invention, wherein two signals include a P-code, and one signal includes both a P-code and a C/A code.

FIG. 5 is a signal configuration transmitted by split-spectrum pseudolite (SS-PL) utilized in the present invention, wherein two signals include both a P-code and a C/A code, and one signal includes a C/A code.

FIG. 6 depicts an integrated split-spectrum pseudolite/satellite base station (SS-PL)/SBS transmitter of the present invention.

FIG. 7 is a schematic diagram showing components of a split-spectrum pseudolite (SS-PL) that is configured to transmit position determining split-spectrum signals.

FIG. 8 is a flow chart that illustrates a method for generating a split-spectrum sideband signal by the integrated split-spectrum pseudolite/satellite base station (SS-PL)/$GPS_D$ transmitter of FIG. 6.

FIG. 9 depicts a flow chart illustrating the method of the present invention for creating a database including a set of coordinates and an identification number D* for each active integrated split-spectrum pseudolite/satellite base station (SS-PL)/$GPS_{D*}$ transmitter.

DETAILED DESCRIPTION OF THE PREFERRED AND ALTERNATIVE EMBODIMENTS.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The given below discussion is applicable to any satellite navigational system, but is focused on GPS applications to be substantially specific.

As was mentioned above, the GPS carriers are based on the fundamental clock rate of 10.23 MHz ($f_0$) and are transmitted at 154 $f_0$ (L1) and at 120 $f_0$ (L2). Thus, an L1 is transmitted at 1575.42 MHz, and an L2 signal is transmitted at 1227.6 MHz. FIG. 1 shows a prior art diagram 10 of power spectral density versus frequency for the currently transmitted GPS signal including an L1 signal and an L2 signal.

Use of PRN codes allows use of a plurality of GPS satellite signals for determining an observer's position and for providing the navigation information. A signal transmitted by a particular GPS satellite is selected by generating and matching, or correlating, the PRN code for that particular satellite. Some of the PRN codes are known and are generated or stored in GPS satellite signal receivers operated by users.

A first known PRN code for each GPS satellite, sometimes referred to as a precision code or P-code, is a relatively long, fine-grained code having an associated clock or chip rate of $f0=10.23$ MHz. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of $f0=1.023$ MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document ICD-GPS-200:GPS Interface Control Document, ARINC Research, 1997, GPS Joint Program Office, which is incorporated by reference herein.

The carrier signals are phase modulated to generate a binary code that has two states of phase modulation. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code.

As was indicated above, a new GPS frequency, L5, is being considered for civil sector uses in order to reserve L2 for military purposes. This new frequency is targeted to provide both carrier phase and C/A-code range information. Two frequencies are proposed for L5; the first being 1207 MHz yielding a 368 MHz separation from L1, and the second being 1309 MHz having a separation of 266 MHz from L1. The L2 currently has a 347 MHz separation from L1.

The L5 carrier signals is presumed to have a phase shift keying modulation by the same C/A-code and 50 bits per second system data which is used to phase-shift key modulate the L1 signal. A nominal signal bandwidth of +/–1.023 MHz centered on the yet-to-be-selected L5 carrier frequency, and an effective user-received signal power level at the surface of the Earth should be identical to the effective user-received signal power level of the L1 C/A-code signal.

The transmitted P-code, the C/A code, and the GPS navigation message are used by the receivers for determining positions.

Pseudolites are ground-based transmitters that broadcast a Pseudo Random Noise (PRN) code (similar to a GPS signal) modulated on an L-band carrier signal, generally synchronized with GPS time. Typically, each transmitter is assigned a unique PRN code so as to permit identification by a remote receiver.

Charles R. Trimble and James J. Spilker, Jr., in the patent application entitled "SATELLITE GLOBAL POSITIONING SYSTEM WITH SPLIT SUBCARRIER MODULATION" Ser. No. 09/425,531, filed on Oct. 22, 1999, invented method and apparatus for generating a second carrier in the Global Navigation Satellite Services (GNSS) and Radio Navigation Satellite Services (RNSS) band, currently 1559–1610 MHz, that does not require any significant changes to the power supply or power amplifiers already designed and flight-approved, and that minimizes the power reduction that will naturally occur when a second carrier is introduced in the satellite transmitter power amplifier, and minimizes or eliminates the inter modulation distortions that also occurs when two independent carriers are passed through a common amplifier. This patent application is incorporated in the present patent application in its entirety and is referred to as the patent application #1.

The patent application #1 specifically indicates that its teachings are equally applicable to positioning systems that utilize other types of signals and other types of carriers. For instance, the methods and apparatus of the patent application #1 can be implemented using pseudolites or a combination of pseudolites and satellites. A pseudolite that generates split-spectrum signals according to the patent application #1 is referred to in the present patent application as a split-spectrum pseudolite (SS-PL).

At first, following the patent application #1, we disclose a split-spectrum pseudolite (SS-PL) that generates split-spectrum signals. Next, we disclose the present invention, including an integrated system of a split-spectrum pseudolite (SS-PL) transmitter and a satellite base station (SBS).

FIG. 2 depicts one of the possible signal configurations that can be transmitted by split-spectrum pseudolite (SS-PL) that is utilized in the present invention. In one embodiment, signal 22 is identical to the currently transmitted GPS L2 signal. That is, a P-code and a split-spectrum pseudolite (SS-PL) positional data are modulated at the L2 frequency (1227.6 MHz). In one embodiment, signal 24 and signal 26 are sideband signals, generated according to the method of patent application #1, with both of signals 24–26 containing identical data. In one embodiment, both a P-code and a C/A code are transmitted, with signal 24 transmitted at 1575.42 MHz and signal 26 transmitted at 1595.88 MHz. This gives a signal 24 that is identical to the currently transmitted GPS L1 signal. That is, a C/A-code and a P-code and GPS navigation data are modulated at the L1 frequency (1575.42 MHz). This gives a split-spectrum pseudolite (SS-PL) that transmits a signal 26 which is compatible with existing GPS receivers.

Referring now to FIG. 3, in one embodiment of the present invention, the split-spectrum pseudolite (SS-PL) transmits two split-spectrum signals, including a P-code, and a C/A code. In this embodiment, signals 34 and 35 are generated according to the method of the patent application #1. More specifically, signals 34 and 35 are sideband signals containing an identical set of data.

Referring still to FIG. 3, in one embodiment, signals 34–35 include a P-code and split-spectrum pseudolite (SS-PL) positional data, wherein signal 34 is transmitted at 1227.6 MHz carrier, and wherein signal 35 is transmitted at 1575.42 MHz carrier. Thus, signal 34 that is identical to the currently transmitted L2 GPS signal and a signal 35 that is transmitted at the same frequency as the currently transmitted L1 GPS frequency. Signal 36 includes a C/A code and (SS-PL) navigation data that is transmitted at a 1595.88 MHz carrier. In another embodiment, signal 36 includes a C/A code and (SS-PL) navigation data that is transmitted at any available frequency.

In one embodiment of the present invention, FIG. 4 depicts a signal structure 40 transmitted by the (SS-PL) including two signals, wherein one signal includes a P-code, and wherein the another signal includes both a P-code and a C/A code.

Referring still to FIG. 4, in one embodiment, signal 47 and signal 48 are generated according to the method of the patent application #1, that is signal 47 and signal 48 are sideband signals containing an identical set of data. In one embodiment, signals 47 and 48 include a P-code and a set of (SS-PL) navigation data, wherein signal 47 is transmitted at 1227.6 MHz carrier and signal 48 transmitted at 1575.42 MHz carrier. Therefore, signal 47 is identical to the currently transmitted L2 GPS signal, wherein signal 48 transmitted at the same frequency is identical to the currently transmitted L1 GPS signal. Signal 49 is transmitted at a frequency of 1595.88 MHz. In another embodiment, signal 49 is transmitted at any available frequency. Signal 49 includes a C/A code, a P-code and a set of (SS-PL) navigation data.

Referring now to FIG. 5, in one embodiment of the present invention, the (SS-PL) transmits two signals, wherein one signal includes both a P-code and a C/A code, and the other signal includes a C/A code. In this embodiment, signal 51 and signal 52 are sideband signals generated according to the method of the patent application #1.

Referring still to FIG. 5, in one embodiment of the present invention, signals 51 and 52 include a P-code, a C/A code and set of (SS-PL) navigation data, wherein signal 51 si transmitted at 1227.6 MHz carrier, and signal 52 is transmitted at 1575.42 MHz carrier. This gives a signal 51 that is identical to the currently transmitted L2 GPS signal and a signal 52 that is transmitted at the same frequency as the currently transmitted L1 GPS signal. Signal 53 is transmitted at a frequency of 1595.88 MHz. Signal 412 includes a C/A code and a set of (SS-PL) navigation data.

Thus, the (SS-PL) utilized in the present invention transmits sideband signals that are phase coherent and which are transmitted at different frequencies. In one embodiment, a pseudolite such as those manufactured by IntegriNautics of Menlo Park, Calif. is modified to make a split-spectrum pseudolite (SS-PL) that generates signals according to the embodiments of FIGS. (2–5) of the present invention.

FIG. 6 depicts an integrated split-spectrum pseudolite/satellite base station (SS-PL)/SBS transmitter (60) of the present invention. In one embodiment, the integrated (SS-PL)/SBS transmitter (60) comprises: a satellite base station (SBS) 72, and a split-spectrum pseudolite (SS-PL) transmitter (80) co-located with the (SBS) 72. The SBS includes a satellite antenna 78 configured to receive satellite signals from a plurality of satellites 62–70. In the preferred embodiment, the SBS (72 of FIG. 6) comprises a differential Global Positioning System (DGPS) base station configured to receive the GPS satellite signals from a plurality of GPS satellites 62–70 plus the differential correction.

As was mentioned above, the differential Global Positioning System (DGPS) is a technique that significantly improves both the accuracy and the integrity of the Global Positioning System (GPS). The most common version of DGPS requires high-quality GPS "reference receivers" at known, surveyed locations. The reference station estimates the slowly varying error components of each satellite range measurement and forms a differential correction for each GPS satellite in view. This differential correction is broadcast to all DGPS users on a convenient communication link. Typical ranges for a local area differential GPS (LADGPS) station are up to 150 km. Within this operating range, the differential correction greatly improves accuracy for all users, regardless of whether selective availability (SA) is activated or is not. Expected accuracies with the conventional DGPS are within the range from 1 to 5 meters.

Users with very stringent accuracy requirements may be able to use a technique called carrier-phase DGPS or CDPGS. These users measure the phase of the GPS carrier relative to the carrier phase at a reference site; thus achieving range measurement precision that is a few percent of the carrier wavelength, typically about one centimeter. These GPS phase comparisons are used for vehicle attitude determination and also in survey applications, where the antennas are separated by tens of kilometers. If the antennas are fixed, then the survey is called static, and millimeter accuracies are possible, because long averaging times can be used to combat random noise. If the antennas are moving, then the survey is kinematic, and shorter time constants should be used with some degradation of accuracy. If the kinematic technique is used in real time, it is called a real time kinematic (RTK) GPS. The given above discussion can be found in "Global Positioning System: Theory and Applications", Volume II, Chapter 1, by Bradford W. Parkinson and James J. Spilker Jr., published by the American Institute of Aeronautics and Astronautics, Inc. in 1996.

A conventional RTK GPS system requires a clear channel for it operation. If the base station data cannot be received, the rover receiver cannot compute relative positions in real time. Problems also occur due to the distance and the available transmit power. The signal may not have sufficient power to be received, or may be attenuated if there is no clear line of sight between the base and rover. Topology or foliage may block the signal entirely, depending on the transmit frequency.

The usage of pseudolites together with a constellation of visible satellites allows to effectively expand the constellation of visible satellites. This is especially important, because in all RTK GPS applications (as it is shown below, an RTK GPS baste station is also the best mode of the present invention), one would like to have an access to at least 6 visible GPS satellites for optimum reliability of usage. Thus, having 5 pseudolites on the site allows one to tolerate even the unlikely situation of having only one visible GPS satellites in the sky view. On the other hand, having access to at least one GPS allows the RTK GPS base station to receive the GPS timing synchronization signals, which is important for the purposes of the present invention, as explained below. Thus, the main idea is to have enough ranging signals from pseudolites so as to operate RTK GPS without interruptions caused by disappearing one or more visible satellites.

The usage of the split-spectrum pseudolites (SS-PL) instead of conventional pseudolites provides also some additional benefits. Indeed, it allows to avoid interference (with the reception of the satellite signals) as well as self-interference (with the reception of the signals transmitted by other split-spectrum pseudolites (SS-PL)) by placing the greater number of other split-spectrum pseudolites (SS-PL) as compared to the number of convention pseudolites with the same duty cycle. The usage of the split-spectrum pseudolites (SS-PL) better conforms to the FAA standards by avoiding the necessity of transferring signals on top of L1(2) signals.

Referring still to FIG. 6, in the preferred embodiment of the present invention, the RTK GPS base station 72 receives at least one GPS timing signal from a plurality of GPS satellites 62–70. Thus, the RTK GPS base station is configured to provide a timing synchronization signal to the split-spectrum pseudolite (SS-PL) transmitter 74. In the preferred embodiment of the present invention, the RTK GPS base station 72 is configured to provide a self-surveying capability for the split-spectrum pseudolite (SS-PL) 74.

In the preferred embodiment of the present invention, the RTK GPS base station 72 determines its position location (a set of positional data) in real time within a centimeter accuracy (please, see discussion above), and transmits this positional set of data to the spectrum pseudolite (SS-PL) 74 that is co-located with RTK GPS base station 72. In another embodiment of the present invention, the position of the spectrum pseudolite (SS-PL) 74 co-located with RTK GPS base station 72 is pre-surveyed. Thus, the spectrum pseudolite (SS-PL) 74 is configured to transmit its own position location as a part of the message.

In the preferred embodiment of the present invention, the spectrum pseudolite (SS-PL) transmitter 74 generates a split-spectrum sideband signal that minimizes interference with the reception of satellite signals by the RTK GPS base station. (See patent application #1.) If there is a plurality of integrated RTK/GPS base station/(SS-PL) transmitters located on the site, each (SS-PL) transmitter should operate within a pre-determined duty cycle (that is set during manufacturing of the (SS-PL)) in order to minimize interference of the (SS-PL) transmitted signals with the reception of the satellite signals by a satellite base station. Therefore, the number K of the integrated RTK/GPS base station/(SS-PL) transmitters that can be located on the site is dependent on the pre-determined duty cycle of the split-spectrum pseudolite (SS-PL).

EXAMPLE

If the pre-determined duty cycle of the split-spectrum pseudolite (SS-PL) is 10%, the maximum number K of the integrated RTK/GPS base station/(SS-PL) transmitters that can be located on the site is 10, so that there is the 100% (10% *10) utilization of the time allowed for the transmission of the split-spectrum pseudolite ranging signals that can be used for the site ranging purposes without undue interference with the reception of the satellite signals by each satellite base station.

In another embodiment of the present invention, the satellite base station further comprises a differential GPS base station configured to provide a GPS timing synchronization signal to the SS-PL pseudolite transmitter, and configured to provide the self-surveying capability for the split-spectrum pseudolite (SS-PL) with a sub-meter accuracy.

FIG. 7 is a schematic diagram showing components of a split-spectrum pseudolite (SS-PL) (74 of FIG. 6) that is configured to transmit position determining split-spectrum signals. In the preferred embodiment of the present invention, the split-spectrum pseudolite (SS-PL) (74 of FIG. 6) is configured to transmit the L1 GPS signals. In another embodiment, the split-spectrum pseudolite (SS-PL) (74 of FIG. 6) is configured to transmit the L2 GPS signals. Yet, in one more embodiment, the split-spectrum pseudolite (SS-PL) (74 of FIG. 6) is configured to transmit the L5 GPS signals.

Referring still to FIG. 7, the split-spectrum pseudolite (SS-PL) includes controller 110 that is configured to control the operations of (SS-PL) 74. In one embodiment, the controller 110 comprises a microprocessor, multiple linked microprocessors or a general purpose computing device. In one embodiment, controller 110 includes one or more semiconductor device(s) that function as a general purpose computer. The controller (and its software) integrates all (SS-PL) functions such as satellite timing synchronization, self-surveying, pseudolite message generation, C/A code generation, P-code generation.

In one embodiment, the controller 110 includes the code generator 118 that can be an application specific integrated circuit device or one or more programs that run on a microprocessor. In another embodiment, the code generator 118 includes tapped feedback switch registers that may be used to generate a code. In one embodiment, the code is a P-code. In another embodiment, a C/A code is generated. Yet, in one more embodiment, both a P-code and a C/A code are generated. In general, any of a number of different codes, and/or combinations of codes may be used. More detailed data regarding GPS C/A codes, and P-codes is contained in GPS ICD 200 m GPS Interface Control Document, which is incorporated herein by reference.

The usage of P-codes is the best mode of the present invention because it allows to implement the integrated split-spectrum pseudolite/satellite base station (SS-PL)/RTK GPS base station transmitter having the minimum duty cycle (and, therefore, allows to place a greater number of (SS-PL)/RTK GPS base station transmitters on the working site), as compared with the utilization of C/A codes that leads to the (SS-PL)/RTK GPS base station transmitter having a longer duty cycle.

Referring still to FIG. 7, data storage device 113 is coupled to controller 110 for storing data. In one embodiment, data storage device 113 includes one or more Dynamic Random Access Memory (DRAM) device(s). In the alternative embodiment, data storage device 113 comprises one or more Static Random Access Memory (SRAM) device(s) or a flash memory device. In one embodiment, set of (SS-PL) location coordinates is stored in data storage device 113.

Continuing with FIG. 7, in one embodiment of the present invention, (SS-PL) 74 also includes: frequency synthesizer 108, baseband processor 109, reference counter and phase measurement circuitry 111, radio receiver 112 for receiving a set of GPS formatted navigational data, timing system 120, and modulator 115.

In one embodiment the modulator 115 is coupled to controller 110 for modulating the code and the (SS-PL) navigation data to produce a modulated split-spectrum sideband L1 signal. In one embodiment, modulator 115 includes two modulators (not shown) adapted to modulate data onto a carrier signal so as to produce two sideband signals.

In one embodiment, modulator 115 includes a local oscillator that operates at a frequency of 1227.6 MHz and a local oscillator that operates at a frequency of 1585.65 MHz. In this embodiment, modulator 115 modulates the P-code and GPS navigation data onto a 1227.6 MHz carrier and modulates the P-code, the C/A code and GPS navigation data onto a 1585.65 MHz carrier. This signal is then split by modulator 115 into signal 24 (of FIG. 2), which is at a frequency of 1575.42 MHz and signal 26 (of FIG. 2), that is at a frequency of 1595.88 MHz. These two sideband signals are amplified by amplifier (not shown) and are transmitted to multiplexer (not shown) that combines signals 22-24-26 and transmits the combined signal to antenna 119 (see discussion below) that radiates the combined signal. FIGS. (3–5) show other signal types that may be generated and transmitted for determining position according to the present invention. The signals shown in FIGS. (3–5) may be generated by varying the data modulated onto modulator 115, and by varying the frequencies at which modulator 115 operates. Also, though the present invention is described with respect to the use of signals transmitted in the L-band, other bands could also be used.

In one embodiment, modulator 115 is configured to modulate the code and the GPS navigation data to produce a modulated split-spectrum sideband L1 signal having a peak power at frequencies at which P(Y) code has nulls. In another embodiment, modulator 115 is configured to modulate the code and the GPS navigation data to produce a modulated split-spectrum sideband L2 signal having a peak power at frequencies at which P(Y) code has nulls. Yet, in one more embodiment, modulator 115 is configured to modulate the code and the GPS navigation data to produce a modulated split-spectrum sideband L5 signal having a peak power at frequencies at which P(Y) code has nulls.

The GPS receivers utilize the cross-correlation of L1 and L2 signals for the reception purposes. Therefore, both the military and the civil use GPS receivers can determine the location of P(Y) nulls.

In one embodiment of the present invention, modulator 115 is configured to modulate the code and the GPS navigation data to produce a modulated split-spectrum sideband $(L1 \mp \Delta 1)$ MHz signal having a frequency shift $\Delta 1$ and having a peak power at frequencies at which P(Y) code has nulls. The frequency shift $\Delta 1$ determines how far a signal noise is removed from the center frequency L1. In one embodiment, the frequency shift $\Delta 1$ is equal to K1 multiplied by 10.23 MHz, wherein K1 is an integer.

In another embodiment of the present invention, modulator 115 is configured to modulate the code and the GPS navigation data to produce a modulated split-spectrum sideband $(L2 \mp \Delta 2)$ MHz signal having a frequency shift $\Delta 2$ and having a peak power at frequencies at which P(Y) code has nulls. In one embodiment, the frequency shift $\Delta 2$ is equal to K2 multiplied by 10.23 MHz, wherein K2 is an integer.

Yet, in one more embodiment of the present invention, modulator 115 is configured to modulate the code and the GPS navigation data to produce a modulated split-spectrum sideband $(L5 \mp \Delta 5)$ MHz signal having a frequency shift $\Delta 5$ and having a peak power at frequencies at which P(Y) code has nulls.

In one embodiment, the timing system 120 is configured to receive the GPS synchronization timing signal from the co-located GPS base station. In one embodiment, the GPS timing signal is stored in data storage device 360. In another embodiment, the timing system 120 includes one or more highly accurate time-keeping system. In one embodiment, the (SS-PL) transmitter includes a GPS receiver 117 configured to receive a GPS satellite synchronization signal and a plurality of exact GPS satellite frequencies.

Signal generator 104 provides a standard reference frequency to various other components of (SS-PL) 74. Reference counter and phase measurement circuits 111 provide phase measurement and operate as a reference counter.

In one embodiment of the present invention, controller 110 includes a code generator 118 that generates a pseudolite P-code which is delayed as compared with a GPS P-code by a delay D. In one embodiment of the present invention, the delay D is used to identify the integrated split-spectrum pseudolite/satellite base station (SS-PL)/RTK GPS base station transmitter as a (SS-PL)/RTK $GPS_D$ transmitter having the D identification number.

In one embodiment of the present invention, controller 110 includes a code generator 118 configured to generate a pseudolite P-code delayed by at least one minute as compared with the GPS P-code. The minimum delay D=1 min can be used to identify the integrated split-spectrum pseudolite (SS-PL)/RTK GPS base station transmitter as a (SS-PL)/RTK GPS $_{D=N}$ transmitter having the D={N multiplied by one-minute delay} number, wherein N is an integer.

In one embodiment of the present invention, controller 110 includes a message generator 119 configured to generate a set of (SS-PL) data message responsive to a set of formatted GPS navigation data received by the satellite base station. In the preferred embodiment, the set of (SS-PL) data message has a substantial capacity required to support at least one GPS integrity update and at least one (SS-PL) integrity update; and has a substantial capacity required to support a set of DGPS corrections for code and carrier at a substantially high data rate. In the preferred embodiment, the set of (SS-PL) data message includes a set of the (SS-PL) positional data.

In one embodiment, the (SS-PL) 74 further includes a pseudolite antenna 119 coupled to the modulator 115 for transmitting the position determining sideband L1 split-spectrum signal. In another embodiment, the (SS-PL) 74 further includes a pseudolite antenna 119 for transmitting the position determining sideband L2 split-spectrum signal. Yet, in one more embodiment, pseudolite antenna 119 is configured to transmit the position determining sideband L5 split-spectrum signal.

More specifically, in one embodiment, the pseudolite antenna 119 includes an L-band antenna array. In this embodiment, the sideband signals are combined using a multiplexer (not shown), and are radiated using the L-band antenna array.

In one embodiment, the (SS-PL) 74 further includes GPS receiver 117 including receiver antenna 121 configured to detect a signal transmitted by at least one additional integrated split-spectrum pseudolite (SS-PL)/RTK $GPS_{D1}$ transmitter having a D1 identification delay number.

In one embodiment of the present invention, flow chart 140 of FIG. 8 illustrates a method for generating a split-spectrum sideband signal by the integrated split-spectrum pseudolite/satellite base station (SS-PL)/ $GPS_D$ transmitter (60 of FIG. 6).

In the preferred embodiment, the GPS timing synchronization signal is provided by the RTK GPS base station (step 142 of FIG. 8). In the preferred embodiment, the RTK GPS base station also provides a self-surveying capability for the split-spectrum pseudolite (SS-PL) (step 144 of FIG. 8) with a centimeter accuracy. In another embodiment, the integrated split-spectrum pseudolite/satellite base station (SS-PL)/GPS$_D$ transmitter (60 of FIG. 6) is pre-surveyed in advance.

The integrated split-spectrum pseudolite/satellite base station (SS-PL)/GPS$_D$ transmitter generates and transmits a split-spectrum sideband signal (step 146) that includes as a part of its message a set of its position coordinates.

In the preferred embodiment, the working site is covered by K$_{MAX}$ integrated split-spectrum (SS-PL)/GPS$_D$ transmitters, wherein the number K$_{MAX}$ is selected to maximize utilization of the time allowed for the transmission of the split-spectrum pseudolite ranging signals that can be used for ranging purposes without undue interference with the reception of the GPS satellite signals by each GPS satellite base station, and without undue self-interference with signals transmitted by other split-spectrum (SS-PL)/GPS$_D$ transmitters. The rover placed anywhere in the working site is configured to receive a substantially sufficient number of satellite signals and signals transmitted by (SS-PL)/GPS$_D$ transmitters in order to determine its position coordinates.

In the preferred embodiment, each active (that is, transmitting) integrated split-spectrum (SS-PL)/GPS$_D$ transmitters is equipped with a GPS receiver (117 of FIG. 7) configured to detect each split spectrum sideband signal generated by any active integrated (SS-PL)/GPS$_{D1}$ transmitter having a delay D1 identification number and located on the same site (step 142). This detection capability allows one to provide a degree of flexibility in organizing a network of integrated split-spectrum (SS-PL)/GPS$_D$ transmitters on the site. For instance, it allows to turn off at least one integrated split-spectrum (SS-PL)/GPS$_D$ transmitter if the number K of active (SS-PL)/GPS$_D$ transmitters located on the site exceeds the maximum number K$_{MAX}$.

FIG. 9 depicts a flow chart 160 illustrating the method of the present invention for creating a database, wherein each element of the database includes a set of position coordinates and an identification number D* for an active integrated split-spectrum pseudolite/satellite base station (SS-PL)/GPS$_{D*}$ transmitter.

After determining a set of coordinates for each active (transmitting) integrated split-spectrum pseudolite/satellite base station (SS-PL)/GPS$_{D*}$ transmitter having a delay D* identification number (step 164 of FIG. 9), each set of coordinates is matched with its identification number D* (step 166 of FIG. 9), and a database is created (step 168 of FIG. 9), wherein each element of the database includes a set of coordinates and an identification number D* for each active integrated split-spectrum (SS-PL)/GPS$_{D*}$ transmitter. Each integrated split-spectrum (SS-PL)/GPS$_{D*}$ transmitter has access to this database due to its capability of detecting the signals transmitted by any other integrated split-spectrum (SS-PL)/GPS$_{D}$ transmitter, wherein each integrated split-spectrum (SS-PL)/GPS$_{D}$ transmitter transmits sideband signals including its position coordinates and its identification D** number.

In one embodiment, an integrated split-spectrum (SS-PL)/GPS$_{D*}$ transmitter can broadcast a message (step 170 of FIG. 9) including the database including the set of coordinates and the identification number D* for each active integrated split-spectrum pseudolite/satellite base station (SS-PL)/GPS$_{D*}$ transmitter.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An integrated split-spectrum pseudolite/satellite base station (SS-PL)/SBS transmitter comprising:
    a satellite base station;
    a split-spectrum pseudolite (SS-PL) transmitter co-located with said satellite base station; and
    a connection line between said satellite base station and said (SS-PL) transmitter;
    wherein said satellite base station provides a timing synchronization signal;
    and wherein said satellite base station provides a self-surveying capability for said split-spectrum pseudolite (SS-PL);
    and wherein said connection line is used to transmit synchronously a set of satellite data from said satellite base station to said (SS-PL) transmitter;
    and wherein said integrated split-spectrum pseudolite/satellite base station (SS-PL)/SBS transmitter transmits a message including said synchronized satellite data.

2. The integrated split-spectrum pseudolite/satellite base station (SS-PL)/SBS transmitter of claim 1, wherein said satellite base station further comprises:
    a differential GPS base station configured to provide a GPS timing synchronization signal to said SS-PL pseudolite transmitter, and configured to provide said self-surveying capability for said split-spectrum pseudolite (SS-PL) with a sub-meter accuracy.

3. The integrated split-spectrum pseudolite/satellite base station (SS-PL)/SBS transmitter of claim 1, wherein said satellite base station further comprises:
    an RTK GPS base station configured to provide a GPS timing synchronization signal to said split-spectrum (SS-PL) transmitter, and configured to provide said self-surveying capability for said split-spectrum pseudolite (SS-PL) with a centimeter accuracy.

4. The integrated split-spectrum pseudolite (SS-PL)/RTK GPS base station transmitter of claim 3, wherein said (SS-PL)/RTK GPS base station transmitter is configured to transmit position determining split-spectrum L1 GPS signals, and wherein said (SS-PL)/RTK GPS base station transmitter further comprises:
    a code generator for generating a pseudolite P-code, wherein said pseudolite P-code is delayed as compared with a GPS P-code by a delay D; and wherein said delay D is used to identify said integrated split-spectrum pseudolite/satellite base station (SS-PL)/RTK GPS base station transmitter as a (SS-PL)/RTK GPS$_D$ transmitter having said D number;
    a modulator coupled to said code generator for modulating said code and said GPS navigation data to produce a modulated split-spectrum sideband L1 signal;
    a means for receiving a GPS satellite synchronization signal and for receiving a plurality of exact GPS satellite frequencies; and a means for generating a set of (SS-PL) data message responsive to a set of formatted GPS navigation data; wherein said set of (SS-PL) data message has a substantial capacity required to support said at least one GPS integrity update and at least one (SS-PL) integrity update; and wherein said set of (SS-PL) data message has a substantial capacity required to support a set of DGPS corrections for code and carrier at a substantially high data rate; and wherein said set of (SS-PL) data message includes a set of said (SS-PL) positional data.

5. The integrated split-spectrum pseudolite (SS-PL)/RTK GPS base station transmitter of claim 4, wherein said means for receiving a GPS satellite synchronization signal and for receiving a plurality of exact GPS satellite frequencies further includes:
a GPS receiver.

6. The integrated split-spectrum pseudolite (SS-PL)/RTK GPS base station transmitter of claim 3, wherein said (SS-PL)/RTK GPS base station transmitter is configured to transmit position determining split-spectrum L2 GPS signals, and wherein said (SS-PL)/RTK GPS base station transmitter further comprises:
a code generator for generating a pseudolite P-code, wherein said pseudolite P-code is delayed as compared with a GPS P-code by a delay D; and wherein said delay D is used to identify said integrated split-spectrum pseudolite/satellite base station (SS-PL)/RTK GPS base station transmitter as a (SS-PL)/RTK $GPS_D$ transmitter having said D number;
a modulator coupled to said code generator for modulating said code and said GPS navigation data to produce a modulated split-spectrum sideband L2 signal;
a means for receiving a GPS satellite synchronization signal and for receiving a plurality of exact GPS satellite frequencies; and
a means for generating a set of (SS-PL) data message responsive to a set of formatted GPS navigation data; wherein said set of (SS-PL) data message has a substantial capacity required to support said at least one GPS integrity update and at least one (SS-PL) integrity update; and wherein said set of (SS-PL) data message has a substantial capacity required to support a set of DGPS corrections for code and carrier at a substantially high data rate; and wherein said set of (SS-PL) data message includes a set of said (SS-PL) positional data.

7. The integrated split-spectrum pseudolite (SS-PL)/RTK GPS base station transmitter of claim 6, wherein said means for receiving a GPS satellite synchronization signal and for receiving a plurality of exact GPS satellite frequencies further includes:
a GPS receiver.

8. The integrated split-spectrum pseudolite (SS-PL)/RTK GPS base station transmitter of claim 3, wherein said (SS-PL)/RTK GPS base station transmitter is configured to transmit position determining split-spectrum L5 GPS signals, and wherein said (SS-PL)/RTK GPS base station transmitter further comprises:
a code generator for generating a pseudolite P-code, wherein said pseudolite P-code is delayed as compared with a GPS P-code by a delay D; and wherein said delay D is used to identify said integrated split-spectrum pseudolite/satellite base station (SS-PL)/RTK GPS base station transmitter as a (SS-PL)/RTK $GPS_D$ transmitter having said D number;
a modulator coupled to said code generator for modulating said code and said GPS navigation data to produce a modulated split-spectrum sideband L5 signal;
a means for receiving a GPS satellite synchronization signal and for receiving a plurality of exact GPS satellite frequencies; and
a means for generating a set of (SS-PL) data message responsive to a set of formatted GPS navigation data; wherein said set of (SS-PL) data message has a substantial capacity required to support said at least one GPS integrity update and at least one (SS-PL) integrity update; and wherein said set of (SS-PL) data message has a substantial capacity required to support a set of DGPS corrections for code and carrier at a substantially high data rate; and wherein said set of (SS-PL) data message includes a set of said (SS-PL) positional data.

9. The integrated split-spectrum pseudolite (SS-PL)/RTK GPS base station transmitter of claim 8, wherein said means for receiving a GPS satellite synchronization signal and for receiving a plurality of exact GPS satellite frequencies further includes:
a GPS receiver.

10. The integrated split-spectrum pseudolite (SS-PL)/RTK GPS base station transmitter of claim 3 further including:
a radio receiver for receiving a set of GPS formatted navigational data.

11. The integrated split-spectrum pseudolite (SS-PL)/RTK GPS base station transmitter of claim 3 further including:
a signal generator for generating a standard reference frequency.

12. The integrated split-spectrum pseudolite (SS-PL)/RTK GPS base station transmitter of claim 4 further including:
a pseudolite antenna coupled to said modulator for transmitting said position determining sideband L1 split-spectrum signal.

13. The integrated split-spectrum pseudolite (SS-PL)/RTK GPS base station transmitter of claim 6 further including:
a pseudolite antenna coupled to said modulator for transmitting said position determining sideband L2 split-spectrum signal.

14. The integrated split-spectrum pseudolite (SS-PL)/RTK GPS base station transmitter of claim 8 further including:
a pseudolite antenna coupled to said modulator for transmitting said position determining sideband L5 split-spectrum signal.

15. The integrated split-spectrum pseudolite (SS-PL)RTK GPS base station transmitter of claim 3 further including:
a means for detecting at least one integrated split-spectrum pseudolite (SS-PL) RTK $GPS_{D1}$ transmitter having a D1 delay number.

16. The integrated split-spectrum pseudolite (SS-PL)/RTK GPS base station transmitter of claim 15, wherein said means for detecting said at least one integrated split-spectrum pseudolite (SS-PL)/RTK $GPS_{D1}$ transmitter having said D1 delay number further includes:
a GPS receiver.

17. The integrated split-spectrum pseudolite (SS-PL)/RTK GPS base station transmitter of claim 3 further including:
a code selection control means associated with said RTK GPS base station for selecting a type of code to be used in said split-spectrum sideband signal.

18. The integrated split-spectrum pseudolite (SS-PL)/RTK GPS base station transmitter of claim 3 further including:

a time sequence control means associated with said RTK GPS base station for determining a time sequence used for transmitting said split-spectrum sideband signal.

19. The integrated split-spectrum pseudolite (SS-PL)/ RTK GPS base station transmitter of claim 3 further including:
a split-spectrum pseudolite clock synchronized with said GPS timing synchronization signal for generating a plurality of split-spectrum pseudolite clock signals.

20. The integrated split-spectrum pseudolite (SS-PL)/ RTK GPS base station transmitter of claim 10 further comprising:
a data storage device coupled to said radio receiver, wherein said data storage device is configured to store a set of GPS navigation data.

21. The integrated split-spectrum pseudolite (SS-PL)/ RTK GPS base station transmitter of claim 4, wherein said code generator further comprises:
a code generator configured for generating a pseudolite P-code delayed by at least one minute as compared with said GPS P-code; and wherein said minimum delay D=1 min is used to identify said integrated split-spectrum pseudolite (SS-PL)/RTK GPS base station transmitter as a (SS-PL)/RTK $GPS_{D=N}$ transmitter having said D={N multiplied by one-minute delay} number, N being an integer.

22. The integrated split-spectrum pseudolite (SS-PL)/ RTK GPS base station transmitter of claim 4, wherein said modulator is configured to modulate said code and said GPS navigation data to produce a modulated split-spectrum sideband L1 signal having a peak power at frequencies at which P(Y) code has nulls.

23. The integrated split-spectrum pseudolite (SS-PL)/ RTK GPS base station transmitter of claim 6, wherein said modulator is configured to modulate said code and said GPS navigation data to produce a modulated split-spectrum sideband L2 signal having a peak power at frequencies at which P(Y) code has nulls.

24. The integrated split-spectrum pseudolite (SS-PL)/ RTK GPS base station transmitter of claim 8, wherein said modulator is configured to modulate said code and said GPS navigation data to produce a modulated split-spectrum sideband L5 signal having a peak power at frequencies at which P(Y) code has nulls.

25. The integrated split-spectrum pseudolite (SS-PL)/ RTK GPS base station transmitter of claim 4, wherein said modulator is configured to modulate said code and said GPS navigation data to produce a modulated split-spectrum sideband (L1∓Δ1) MHz signal having a frequency shift Δ1 and having a peak power at frequencies at which P(Y) code has nulls, wherein said frequency shift Δ1 determines how far a signal noise is removed from the center frequency L1.

26. The integrated split-spectrum pseudolite (SS-PL)/ RTK GPS base station transmitter of claim 25, wherein said frequency shift Δ1 is equal to K1 multiplied by 10.23 MHz, K1 being an integer.

27. The integrated split-spectrum pseudolite (SS-PL)/ RTK GPS base station transmitter of claim 6, wherein said modulator is configured to modulate said code and said GPS navigation data to produce a modulated split-spectrum sideband (L2∓Δ2) MHz signal having a frequency shift Δ and having a peak power at frequencies at which P(Y) code has nulls, wherein said frequency shift Δ2 determines how far a signal noise is removed from the center frequency L2.

28. The integrated split-spectrum pseudolite (SS-PL)/ RTK GPS base station transmitter of claim 27, wherein said frequency shift Δ2 is equal to K2 multiplied by 10.23 MHz, K2 being an integer.

29. The integrated split-spectrum pseudolite (SS-PL)/ RTK GPS base station transmitter of claim 8, wherein said modulator is configured to modulate said code and said GPS navigation data to produce a modulated split-spectrum sideband (L5∓Δ5) MHz signal having a frequency shift Δ5 and having a peak power at frequencies at which P(Y) code has nulls, wherein said frequency shift Δ5 determines how far a signal noise is removed from the center frequency L5.

30. A method of generating a split-spectrum sideband signal by an integrated split-spectrum pseudolite/satellite base station (SS-PL)/$GPS_D$ transmitter having a delay D identification number; said method comprising the steps of:
providing a timing synchronization signal by said satellite base station;
providing a self-surveying capability for said split-spectrum pseudolite (SS-PL) by said satellite base station;
using a connection line to transmit synchronously a set of satellite data from said satellite base station to said (SS-PL) transmitter;
generating a split-spectrum sideband signal by said integrated split-spectrum pseudolite/satellite base station (SS-PL)/$GPS_D$ transmitter; and
using said integrated split-spectrum pseudolite/satellite base station (SS-PL)/SBS transmitter to transmit a message including said synchronized satellite data;
wherein said split-spectrum sideband signal includes a set of position coordinates for said integrated split-spectrum pseudolite/satellite base station (SS-PL)/$GPS_D$ transmitter having said delay D identification number.

31. The method of claim 30 further including the step of:
detecting at least one additional active split spectrum sideband signal generated by at least one additional intergrated split-spectrum pseudolite/satellite base (SS-PL)/$GPS_{D1}$ transmitter having a delay D1 identification number.

32. The method of claim 31 further including the steps of:
determining a set of coordinates for each said active integrated split-spectrum pseudolite/satellite base station (SS-PL)/$GPS_{D*}$ transmitter having a delay D* identification number;
matching each said set of coordinates with one said integrated split-spectrum pseudolite/satellite base station (SS-PL)/$GPS_{D*}$ transmitter; and
creating a database including a set of coordinates and an identification number D* for each said active integrated split-spectrum pseudolite/satellite base station (SS-PL)/$GPS_{D*}$ transmitter.

33. The method of claim 32 further including the steps of:
broadcasting a message including said database including said set of coordinates and said identification number D* for each said active integrated split-spectrum pseudolite/satellite base station (SS-PL)/$GPS_{D*}$ transmitter.

34. An integrated split-spectrum pseudolite/satellite base station (SS-PL)/SBS transmitter comprising:
a means for providing a timing satellite synchronization signal;
a means for providing a surveying capability for said split-spectrum pseudolite (SS-PL); and
a means for generating a split-spectrum sideband signal;
wherein said means for providing said timing satellite synchronization signal and said means for providing said surveying capability for said split-spectrum pseudolite (SS-PL) are linked to said means for generating said split-spectrum sideband signal.

* * * * *